United States Patent [19]
Rosenthal

[11] Patent Number: 4,909,112
[45] Date of Patent: Mar. 20, 1990

[54] MULTIPLE HEAD GANG SAW WITH SIMPLIFIED, ACCURATE DISPLACEMENT TRANSDUCER

[75] Inventor: Bruce C. Rosenthal, Sheboygan, Wis.

[73] Assignee: Kohler General Corp., Sheboygan Falls, Wis.

[21] Appl. No.: 86,390

[22] Filed: Aug. 17, 1987

[51] Int. Cl.$^4$ .............................................. B27B 5/34
[52] U.S. Cl. ................................. 83/425.4; 83/508.3; 83/575
[58] Field of Search ................... 83/425.4, 508.3, 575, 83/576, 577, 498, 504, 501, 499, 501, 502, 72, 74; 335/3, 215; 361/166, 167; 33/41.4

[56] References Cited

U.S. PATENT DOCUMENTS

| | | | |
|---|---|---|---|
| 1,802,514 | 4/1931 | Johnson | 83/425.4 |
| 2,507,644 | 5/1950 | Peters | 83/508.3 |
| 3,786,705 | 1/1974 | Dorfel | 83/71 |
| 3,992,614 | 11/1976 | Buss | 83/499 X |
| 4,323,098 | 4/1982 | Suzuki et al. | 83/499 X |
| 4,570,518 | 2/1986 | Burmeister et al. | 83/504 |

OTHER PUBLICATIONS

"Jenkins 191 Slat Bed Saw", Jenkins a division of Kohler General Corp., Sheboygan Falls, Wisc.
"Series DCTM Precision Non Contacting Linear Displacement Transducer System", Temposonics Incorporated, Plainview, N.Y.

Primary Examiner—Frank T. Yost
Assistant Examiner—Eugenia A. Jones
Attorney, Agent, or Firm—Andrus, Sceales, Starke & Sawall

[57] ABSTRACT

A multiple head gang saw has a plurality of moveable saw heads (12, 14) providing variable width cutting, and a single magnetostrictive displacement transducer (40) sensing displacement of all of the saw heads. The transducer sender unit (42) is mounted to a transverse cross beam (10), and a magnetostrictive rod (44) extends from the sender unit along and parallel to the cross beam. A plurality of pairs of electromagnets (62, 64, 87, 89) are mounted to respective saw heads proximate the magnetostrictive rod. Switching circuitry (116) selectively energizes a chosen electromagnet pair and de-energizes the remaining electromagnet pairs such that only the chosen electromagnet pair generates a magnetic field interacting with the signal in the rod from the sender unit, such that the displacement transducer indicates the distance from the sender unit to the chosen electromagnet pair and its respective saw head along the cross beam.

7 Claims, 3 Drawing Sheets

MULTIPLE HEAD GANG SAW WITH SIMPLIFIED, ACCURATE DISPLACEMENT TRANSDUCER

BACKGROUND

The invention relates to multiple head gang saws, including slat beds, roll feeds and multiple beam machines.

In a multiple head gang saw, a plurality of moveable saw heads provide variable width cutting, for example to cut a workpiece into a plurality of parallel slats of desired width. In the prior art, each moveable saw head has its own dedicated position or displacement transducer for indicating the linear displacement of that saw head from a reference point. Displacement of the moveable saw head is sensed by a transducer which monitors rotation of a screw drive or a pinion driving a rack. These types of transducer arrangements may not be precise enough for close tolerance applications and suffer some slop particularly with age and wear.

SUMMARY

The present invention arose from efforts to provide a more accurate displacement transducer system for a multiple head gang saw. The invention also arose from efforts to provide a simplified and economical displacement transducer system.

The present invention provides a multiple head gang saw with a magnetostrictive displacement transducer system affording the desired accuracy. The invention further enables the use of a single transducer for sensing the displacement of all of the saw heads, eliminating the need for multiple transducers, and providing a significant cost advantage.

DETAILED DESCRIPTION

Prior Art

Figure 1:
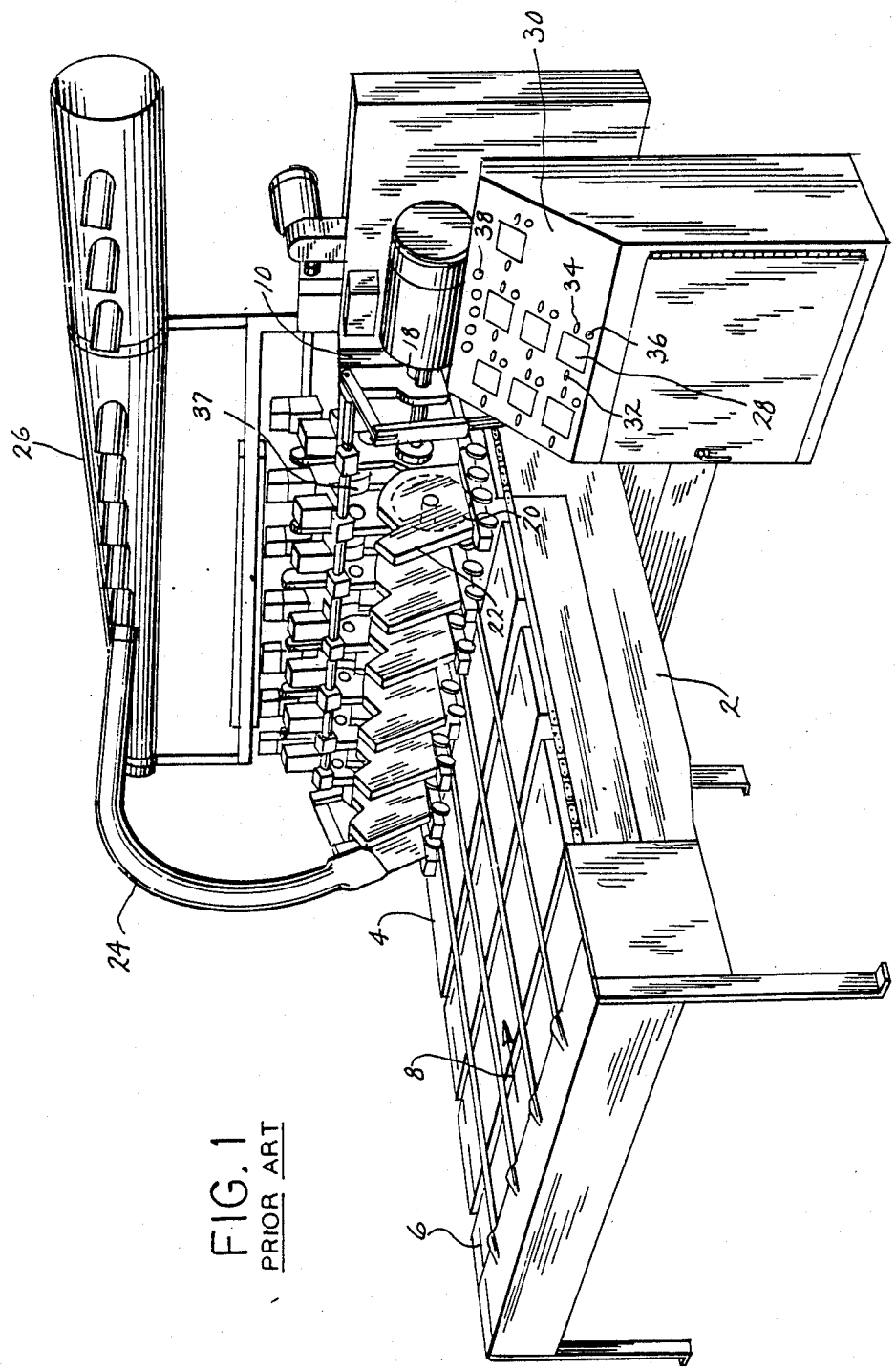
FIG. 1 is a perspective view of a multiple head gang saw known in the art.
Figure 2:
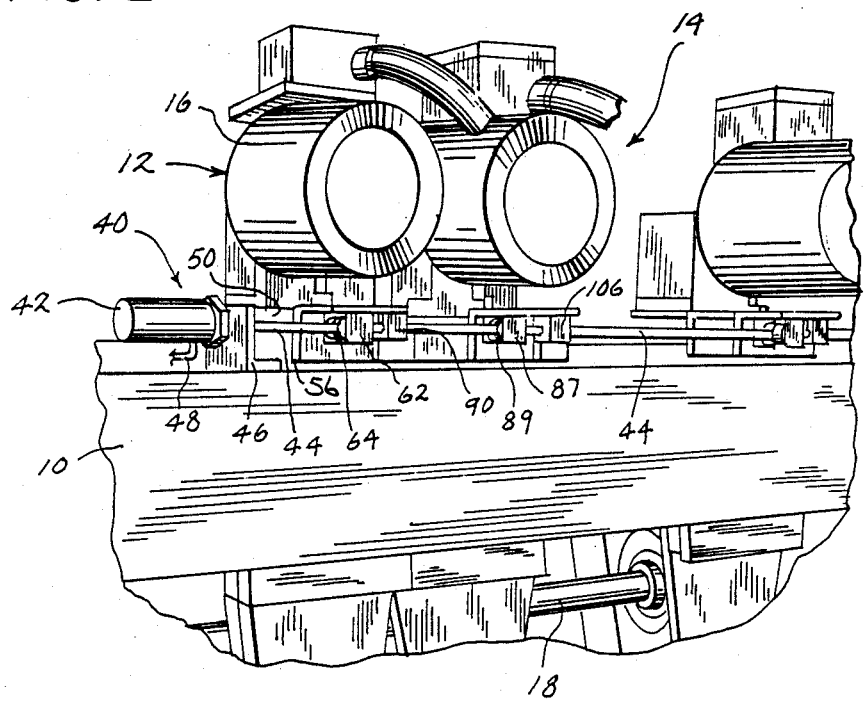
FIG. 2 is a perspective view showing a portion of the structure of FIG. 1 from the rear.

FIG. 1 is a multiple head gang saw known in the art, a Jenkins 191 slat bed saw commercially available from Jenkins, a division of Kohler General Corp., 100 Clark Street, Sheboygan Falls, Wis. 53085. A support frame 2 includes a conveyor bed 4, such as a slat bed, chain track or roller bed, receiving a workpiece 6 moving in the direction shown by arrow 8. A cross beam 10, FIGS. 1 and 2, is mounted to the frame and extends transversely to the direction of arrow 8. A plurality of saw heads such as 12 and 14 are moveably mounted to cross beam 10 for cutting workpiece 6 along parallel cuts as the workpiece moves past the saw heads. Each saw head has an electric motor 16 and an associated screw drive for moving the saw head along cross beam 10. Other drive arrangements are known for the saw heads, such as single drive screw with plural clutch/nut systems, and plural screw drives. Each saw head is individually moveable to vary the width between the cuts. An arbor drive 18 drives all of the saw blades such as 20 through appropriate gear mechanisms, through other saw driving arrangements are also known. Each saw blade has a shroud 22 discharged through a flexible tube such as 24 to exhaust tube 26.

Each saw head such as 12 includes a displacement transducer which measures for example the amount of rotation of a screw drive by motor 16, which in turn indicates the linear displacement of saw head 12 along cross beam 10 from a given fixed reference point. The sensed displacement is displayed at a display 28 on control panel 30. There are seven such displays on the control panel corresponding respectively to the seven saw heads, though such number is variable according to the particular application. Control button 32 actuates the motor for that respective saw head to move it to the left along cross beam 10. Control button 34 activates the saw head motor to move the saw head to the right along cross beam 10. Control button 36 activates an air cylinder 37 for that respective saw head to raise the saw head and blade above the workpiece. Control buttons such as 38 at the top of the panel control various main system functions such as power on/off, arbor drive 18, etc. The apparatus described thus far is known in the art and commercially available as above noted.

Present Invention

FIGS. 2-6 show modifications of the apparatus of FIG. 1 in accordance with the invention. A magnetostrictive displacement transducer 40 is provided by a Temposonics series DCTM linear displacement transducer, commercially available from Temposonics Incorporated, 131 East Ames Court, Plainview, N.Y. 11803. As more fully disclosed in their brochure entitled "Series DCTM Precision Non Contacting Linear Displacement Transducer System", and the pertinent manual pages for the device (copies of which are part of the file wrapper for this application), the system operates by a strain pulse launched into a ferromagnetic (magnetostrictive) rod member, which is a tubular wave guide member within the rod. The pulse travels through the rod and creates an interacting magnetic field which interacts with the electromagnetic field to twist the waveguide. The present invention applys spaced electromagnetic devices to provide a corresponding magnetic field for interaction with the transmitted pulses to establish the several independent controls for the several heads of the gang saw or the like. Transducer 40 includes a sender unit 42 which generates a signal, and a magnetostrictive rod or wire 44 extending from sender unit 42 and receiving the signal. In the Temposonics unit, an annular permanent magnet (not shown) is around rod 44, and the magnetic field from such magnet interacts with the signal on rod 44. The signal sent from sender unit 42 arrives back at sender unit 42 a given interval later depending on the distance along rod 44 between the sender unit and the permanent magnet. The transducer generates an output signal at 48 indicating the distance along rod 44 between the sender unit and the permanent magnet. Various displacement ranges are available, from zero to twelve inches, on up to zero to thirty feet.

In the present apparatus, sender unit 42 is mounted by bracket 46 to cross beam 10, and magnetostrictive rod 44 extends from the sender unit along and parallel to cross beam 10. The above noted permanent magnet is omitted. Instead, a plurality of electromagnets are mounted to respective saw heads such as 12 proximate magnetostrictive rod 44. Each electromagnet is energizeable to generate a magnetic field to interact with the signal in rod 44.

Figure 3:
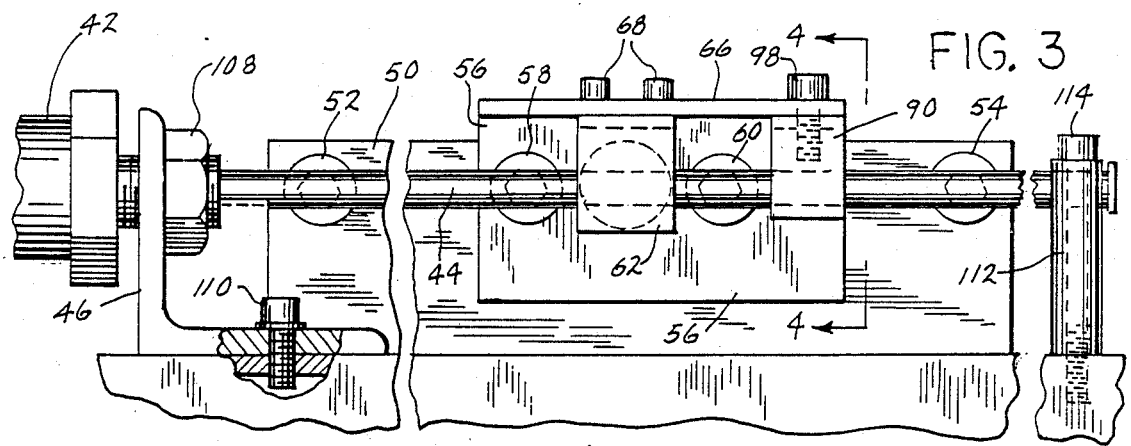
FIG. 3 is an elevation view of a portion of the structure in FIG. 2.
Figure 4:
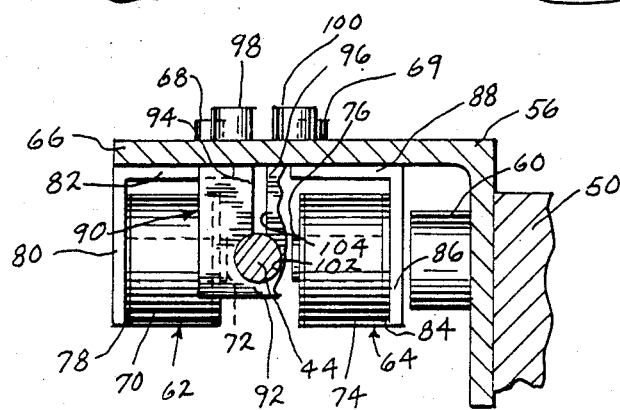
FIG. 4 is a sectional view taken along line 4—4 of FIG. 3.
Figure 5:
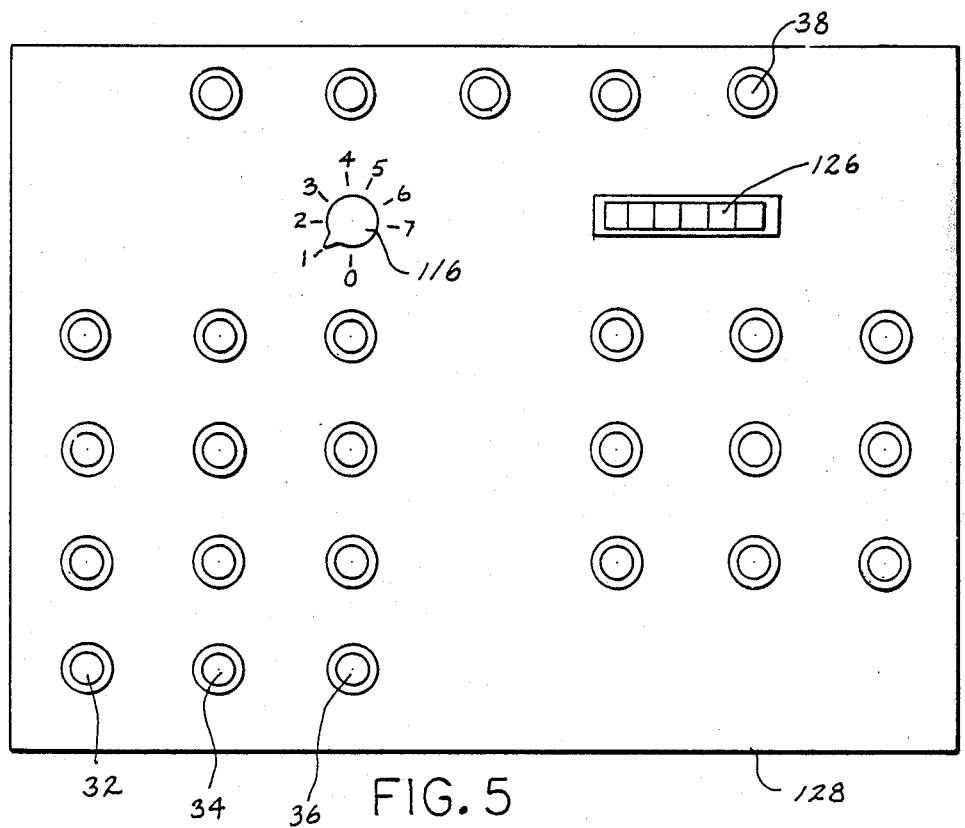
FIG. 5 is a front view of the control panel replacing the panel in FIG. 1.

As shown in FIGS. 2-4, each saw head has a plate 50 mounted thereto by bolts 52 and 54, 58 and 60. An inverted L-shaped bracket 56 is mounted to plate 50 by bolts 58 and 60. A pair of electromagnets 62 and 64 are mounted to the upper horizontal leg 66 of L bracket 56 by bolts such as 68 and 69. Electromagnet 62 includes a coil 70 wound around core 72 extending axially therethrough. Electromagnet 64 includes coil 74 wound around core 76 extending axially therethrough. Cores 72 and 76 are axially aligned and separated by a gap through which rod 44 extends. The axis of cores 72 and 76 is perpendicular to rod 44. Coil 70 is wound on bobbin 78 which is attached to inverted L-shaped sub-bracket 80 having an upper horizontal leg 82 mounted to upper leg 66 of bracket 56 as above noted by bolts such as 68. Coil 74 is wound on bobbin 84 attached to inverted L-shaped sub-bracket 86 having upper horizontal leg 88 mounted as above noted to upper leg 66 of bracket 56 by bolts such as 69. The other electromagnet pairs, such as 87 and 89 for saw head 14, are comparable.

A plurality of guides are mounted to respective saw heads and move with the saw heads along rod 44. Rod 44 extends through such guides, and the guides support the rod. Guide 90 is a generally U-shaped member opening upwardly and having a lower bight 92 receiving rod 44, and having upper legs 94 and 96 mounted to upper horizontal leg 66 of bracket 56 by bolts 98 and 100. Legs 94 and 96 have a lower gap 102 therebetween which is substantially circular and of the same diameter or width as rod 44. Legs 94 and 96 have an upper gap 104 therebetween of a width less than the width of rod 44. Guide 90 is made of a teflon or nylon material to provide low resistance limited flex capability such that legs 94 and 96 are laterally flexible away from each other to expand gap 104 to at least the width of rod 44 to allow guide 90 to be slid transversely across rod 44 such that rod 44 passes transversely through widened gap 104 and into gap 102 after which legs 94 and 96 move towards each other to narrow gap 104 and retain and support rod 44 in gap 102. Legs 94 and 96 are then secured to upper portion 66 of bracket 56 by bolts 98 and 100. Guide 90 is aligned with electromagnets 62 and 64 such that rod 44 passes between electromagnets 62 and 64 and then through guide 90. Guide 90 moves with its respective saw head 12 along rod 44 and supports such rod. The other guides, such as 106 for saw head 14, are comparable. Rod 44 is secured at one end to sender unit 42 which is mounted by nut 108 to bracket 46. Bracket 46 is mounted to cross beam 10 by bolt 110. The other end of rod 44 is held by stand 112 which is mounted to cross beam 10 by bolt 114.

Figure 6:
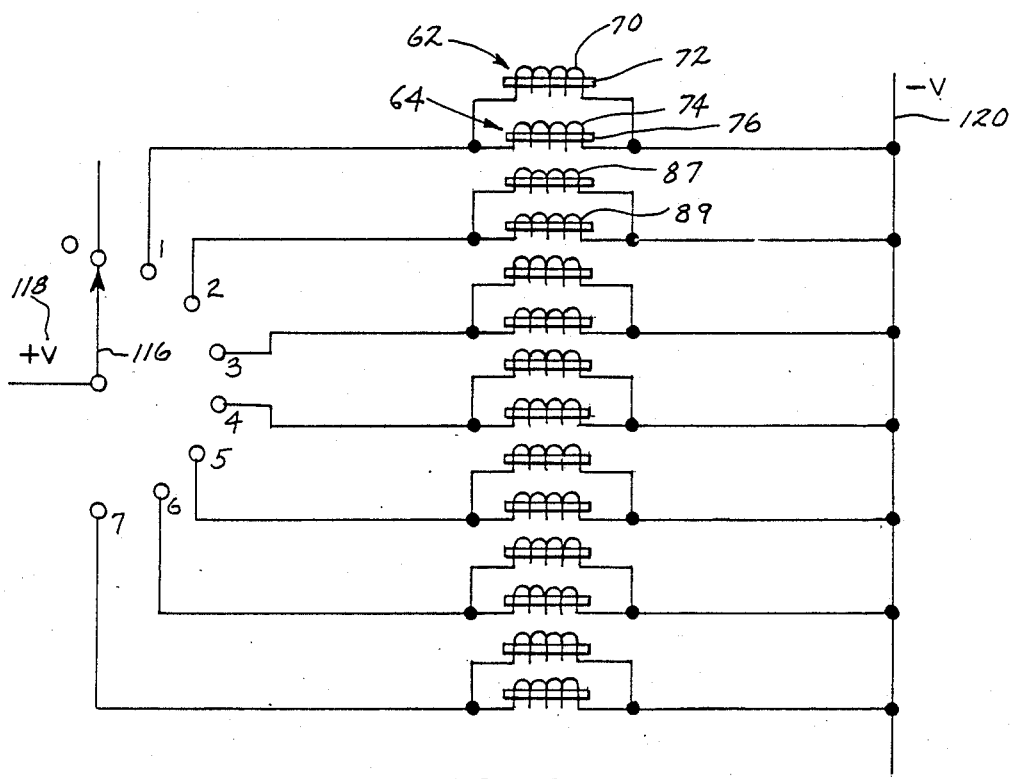
FIG. 6 is a circuit diagram of electromagnet coil energization circuitry in accordance with the invention.

FIG. 6 shows the circuitry for energizing the plural pairs of electromagnets. A rotary selector switch 116 is shown at position "0", wherein none of the electromagnet pairs are energized. At position "1", an electrical circuit is completed from voltage source 118 through parallel connected coils 70 and 74 of electromagnets 62 and 64 to the voltage return reference at 120. At position "2", the pair of electromagnets 87 and 89 are energized, and so on for the remainder of the electromagnet pairs. When the first electromagnet pair 62, 64 is energized, the remaining electromagnet pairs are de-energized, such that only the chosen electromagnet pair generates a magnetic field interacting with the signal in rod 44, such that the output of displacement transducer 40 indicates the distance from sender unit 42 to the chosen electromagnet pair and its respective saw head such as 12 along cross beam 10. Rotary selector switch 116 provides this selective energization of a chosen electromagnet pair. The transducer output signal at 48 is supplied to display 126 on control panel 128, FIG. 5. Other electromagnet pairs are chosen according to the position of rotary selector switch 116 such that the output of displacement transducer 40 indicates the distance from sender unit 42 to the chosen electromagnet pair and its respective saw head along cross beam 10. In this manner, only a single transducer is needed, and likewise only a single display 126 is needed on the control panel. The remaining controls are the same as in FIG. 1 as indicated by like reference numerals. As in FIG. 1, control panel 128 in FIG. 5 has seven sets of three control buttons 32, 34 and 36, one set for each saw head for controlling left, right and lift, respectively, as above. Sets are added or deleted according to the number of saw heads in the particular application.

Other switching circuitry may be used for selective energization of a chosen electromagnet or electromagnet pair, including computer control to simultaneously or sequentially automatically position the saw heads. The selective energization of a chosen electromagnet or electromagnet pair multiplexes the displacement transducer to sense displacement of each of the saw heads individually one at a time without interference or interaction with other magnets along rod 44. The nonenergized electromagnets are not in the circuit and do not interact with the signal on rod 44. In contrast, a plurality of permanent magnets along rod 44 would create multiple interactions with the signal on rod 44 and would not be feasible for sensing the displacement of a chosen saw head without complex discriminating circuitry, which is cost objectionable. The plural permanent magnet objection can be overcome by providing only a single magnet on a rod, but this requires a plurality of transducers, i.e. a dedicated transducer sender unit and rod for each saw head. This latter alternative is cost objectionable. The present invention overcomes these cost objections and enables the use of a single transducer sender unit and rod. The invention enables displacement sensing of multiple saw heads with a single transducer.

It is recognized that various equivalents, alternatives and modifications are possible within the scope of the appended claims.

I claim:

1. A multiple head gang saw comprising a plurality of moveable saw heads providing variable width cutting, displacement transducer means sensing the displacement of said saw heads from a reference point and including a common input/output element located adjacent each of said heads, and each said head having separate means coupled to said element and each of said separate means being selectively and separately activated to coact with said common input/output element to create an output related to the displacement of said associated head, means for multiplexing said separate means and said transducer means to sense said displacement of each of said saw heads individually one at a time and enabling a single transducer means to sense the displacement of all of said saw heads, without a dedicated transducer means for each said saw head.

2. A multiple head gang saw comprising:
a support frame including a conveyor bed receiving a workpiece moving in a first direction, and cross beam means extending transversely to said first direction;
a plurality of saw heads moveably mounted to said cross beam means for cutting said workpiece along parallel cuts as said workpiece moves past said saw heads, said saw heads being individually moveable along said cross beam means to vary the width between said cuts;
magnetostrictive displacement transducer means comprising a sender unit mounted to said cross beam means and generating a signal, a magnetostrictive rod extending from said sender unit along and parallel to said cross beam means and receiving said signal, and a plurality of electromagnet means mounted to respective said saw heads proximate said magnetostrictive rod, each electromagnet means being energizable to generate a magnetic field interacting with said signal in said rod, said transducer means having an output indicating the distance along said rod between said sender unit and said interacting magnetic field;
means for selectively energizing a chosen electromagnet means and de-energizing the remaining electromagnet means such that only said chosen electromagnet means generates a magnetic field interacting with said signal in said rod such that the output of said displacement transducer means indicates the distance from said sender unit to said chosen electromagnet means and its respective saw head along said cross beam means, said selective engerizing means being operable to energize other chosen electromagnet means such that the output of said displacement transducer means indicates the distance from said sender unit to said other chosen electromagnet means and its respective saw head along said cross beam means.

3. The invention according to claim 2 comprising a plurality of guides mounted to respective said saw heads and moveable with said saw heads along said rod, wherein said rod extends through said guides, and wherein said guides support said rod.

4. The invention according to claim 3 comprising a plurality of brackets each mounted to a respective said saw head, each bracket having a pair of electromagnets mounted thereto such that said rod extends between said pair of electromagnets, and wherein said respective guide is mounted to said bracket in alignment with said pair of electromagnets such that said rod extends between said pair of electromagnets and then through said guide.

5. The invention according to claim 4 wherein said guide comprises a generally U-shaped member opening upwardly and having a lower bight receiving said rod and having upper legs mounted to said bracket.

6. The invention according to claim 3 wherein said guide comprises a generally U-shaped member having a bight receiving said rod and having a pair of legs extending from said bight, said legs being spaced by a first gap at said bight of a width about equal to the width of said rod, said legs being spaced by a second gap adjacent said first gap and of a width less than said width of said rod, said legs being laterally flexible away from each other to expand said second gap to at least said width of said rod to allow said guide to be slid transversely across said rod such that said rod passes transversely through said second gap and into said first gap after which said legs move toward each other to narrow said second gap and retain and support said rod in said first gap.

7. The invention according to claim 2 wherein each said saw head has a pair of electromagnets mounted thereto, each electromagnet comprising a coil wound around a core extending axially therethrough, wherein the cores of the electromagnet pair are axially aligned and separated by a gap through which said rod extends, wherein the axis of said cores is perpendicular to said rod.

* * * * *